United States Patent
Feigenblum

(10) Patent No.: US 11,007,730 B2
(45) Date of Patent: May 18, 2021

(54) DEVICE AND METHOD FOR MOLDING AND CONSOLIDATING A TEXTILE PREFORM

(71) Applicant: ROCTOOL, Le Bourget du Lac (FR)

(72) Inventor: José Feigenblum, Saint Paul (FR)

(73) Assignee: ROCTOOL, Le Bourget du Lac (FR)

( * ) Notice: Subject to any disclaimer, the term of this patent is extended or adjusted under 35 U.S.C. 154(b) by 96 days.

(21) Appl. No.: 16/098,857

(22) PCT Filed: May 10, 2017

(86) PCT No.: PCT/EP2017/061240
§ 371 (c)(1),
(2) Date: Feb. 20, 2019

(87) PCT Pub. No.: WO2017/194640
PCT Pub. Date: Nov. 16, 2017

(65) Prior Publication Data
US 2019/0202148 A1     Jul. 4, 2019

(30) Foreign Application Priority Data
May 10, 2016 (FR) ...................... 1670220

(51) Int. Cl.
| | |
|---|---|
| *B29C 70/54* | (2006.01) |
| *B29C 35/08* | (2006.01) |
| *B29C 33/06* | (2006.01) |
| *B29C 70/34* | (2006.01) |
| *B29C 33/30* | (2006.01) |
| *B29C 70/44* | (2006.01) |
| *B29C 35/16* | (2006.01) |

(52) U.S. Cl.
CPC .............. *B29C 70/54* (2013.01); *B29C 33/06* (2013.01); *B29C 33/306* (2013.01); *B29C 35/0805* (2013.01); *B29C 70/342* (2013.01); *B29C 70/443* (2013.01); *B29C 2035/0811* (2013.01); *B29C 2035/1616* (2013.01)

(58) Field of Classification Search
CPC ........................ B29C 2035/1616; H05B 6/105
USPC ...................................................... 156/242
See application file for complete search history.

(56) References Cited

U.S. PATENT DOCUMENTS

| | | |
|---|---|---|
| 5,002,476 A | 3/1991 | Kerr |
| 5,410,132 A | 4/1995 | Gregg et al. |
| 5,556,565 A | 9/1996 | Kirkwood et al. |
| 10,173,379 B2 | 1/2019 | Feigenblum et al. |

(Continued)

FOREIGN PATENT DOCUMENTS

| | | |
|---|---|---|
| FR | 3 015 919 A1 | 7/2015 |
| WO | 2015/155369 A1 | 10/2015 |

*Primary Examiner* — Matthew J Daniels
*Assistant Examiner* — Hana C Page
(74) *Attorney, Agent, or Firm* — Im IP Law; Chai Im; C. Andrew Im

(57) ABSTRACT

A device to cure/consolidate a textile preform pre-impregnated with polymer. A matrix, without any heating or cooling means, includes a molding face that reproduces the shape of the textile preform and an assembly interface. A sealed bagging of the preform on the matrix. A vacuum pump to apply vacuum inside the sealed bag having the textile preform. A thermal unit includes an induction heater and a receiving interface that cooperates with the matrix assembly interface to position the matrix and to transfer heat between the matrix and the thermal unit.

9 Claims, 1 Drawing Sheet

(56) References Cited

U.S. PATENT DOCUMENTS

| | | | |
|---|---|---|---|
| 2005/0035115 A1* | 2/2005 | Anderson | B29C 70/44 |
| | | | 219/759 |
| 2012/0070526 A1* | 3/2012 | Hinzpeter | B29C 33/06 |
| | | | 425/162 |
| 2014/0023828 A1* | 1/2014 | Feigenblum | B32B 37/10 |
| | | | 428/157 |
| 2015/0013883 A1* | 1/2015 | Matsen | B29C 70/446 |
| | | | 156/148 |
| 2017/0095986 A1 | 4/2017 | Feigenblum et al. | |

* cited by examiner

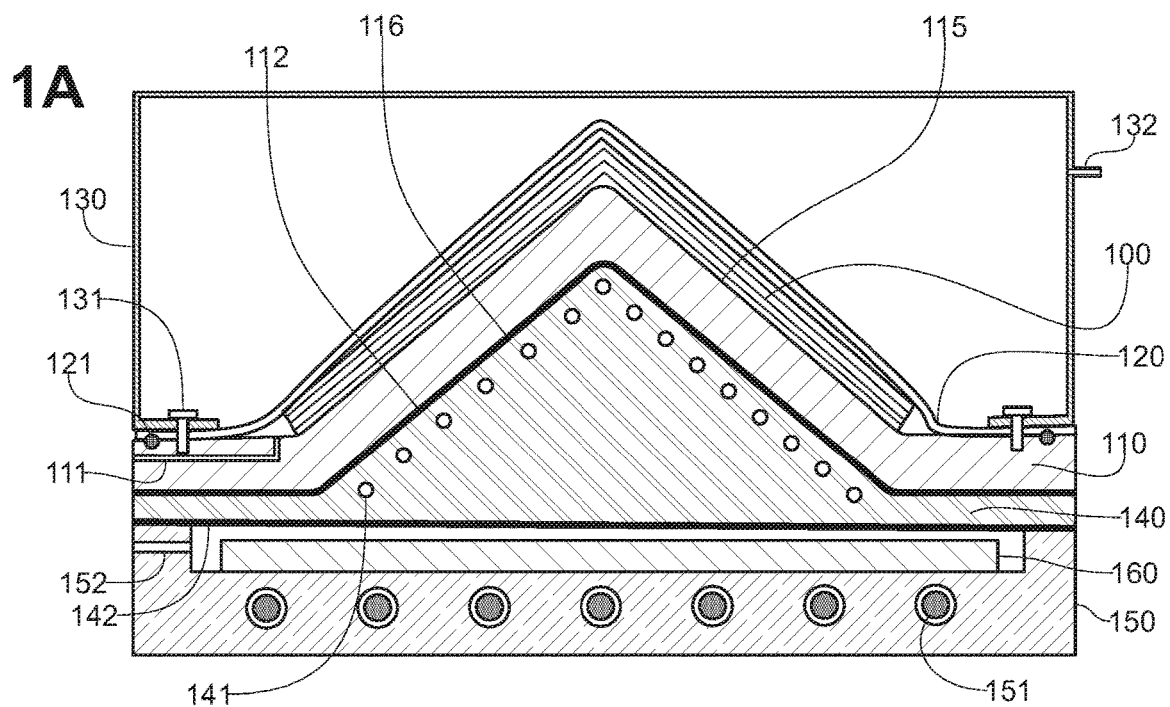
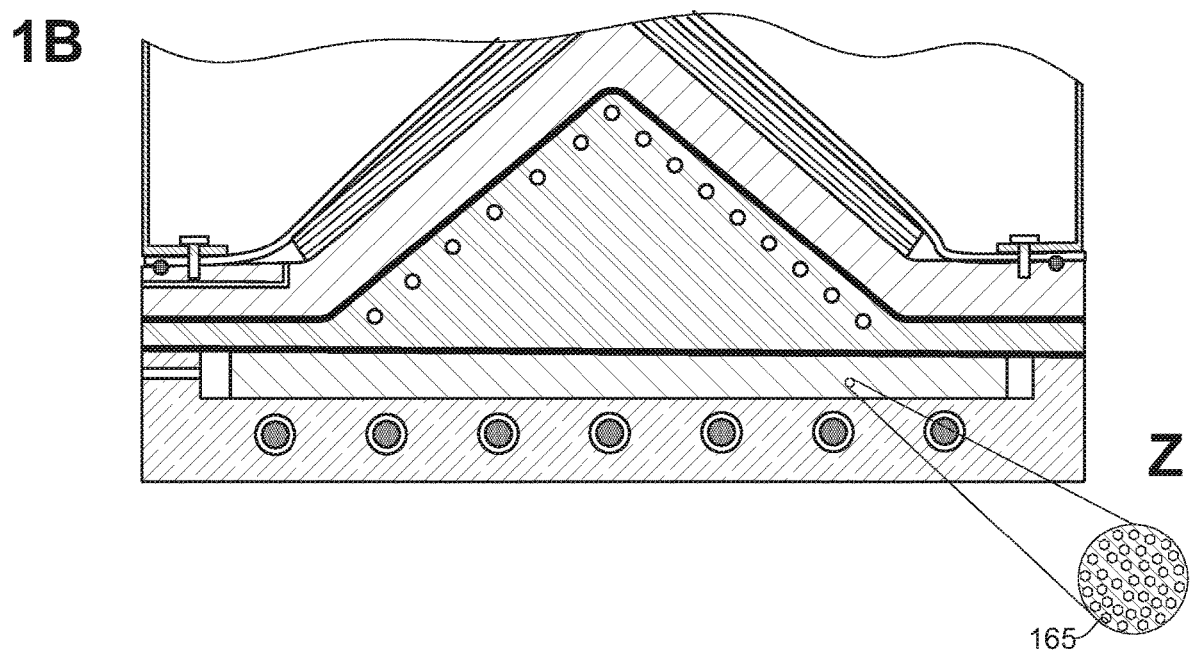

DEVICE AND METHOD FOR MOLDING AND CONSOLIDATING A TEXTILE PREFORM

RELATED APPLICATIONS

This application is a § 371 application from PCT/EP2017/061240 filed May 10, 2017, which claims priority from French Patent Application No. 16 70220 filed May 10, 2016, each of which is herein incorporated by reference in its entirety.

FIELD OF THE INVENTION

The invention relates to a device and method for molding and consolidating a textile preform. The invention belongs to the field of consolidation/curing of a preform made of a laminated structure of fibrous plies pre-impregnated with thermosetting or thermoplastic polymer.

BACKGROUND OF THE INVENTION

In the prior art, the plies making up the preform are laid up manually or by means of a laying up machine on a die that reproduces the shape of the part to make. The laying up techniques for plies impregnated with thermosetting or thermoplastic polymer are known in the prior art and are not described further. At the end of the laying up process, the laminated structure thus obtained and the die are bagged in a sealed manner with a blanket. A vacuum is applied to the inside of said blanket comprising the textile preform, and placed either in an oven or in an autoclave so as to heat under pressure the whole of the preform, the die and the bagging to the temperature of consolidation or curing.

Both the autoclave and the oven are often single pieces of production equipment in a manufacturing workshop, and form bottlenecks in the production flow, particularly in the case of composites with thermosetting matrices, where the open time of the resin is finite before it can be cured. Further, raising the temperature of the whole made up of the tooling and the preform up to the curing/consolidation temperature is time-consuming using such means.

Thus, several independent tools comprising their own heating means have been developed. Said devices comprise integrated heating means in the form of electrical resistors, oil circulation conduits or inductors. However, the integration of these heating means in the tool is costly in terms of machining.

Document WO2015/155369 describes a device for curing/consolidating a textile preform, with autonomous heating and an interchangeable die. That device of the prior art is particularly suitable for making a large part, but remains complex in its design to integrate heating and cooling means for smaller parts, where the surface is less than or equal to approximately 1 m².

OBJECT AND SUMMARY OF THE INVENTION

The invention aims to remedy the drawbacks of the prior art and therefore relates to a device for curing/consolidating a textile preform pre-impregnated with a polymer comprising:
  a. a die, without any heating or cooling means, comprising a molding face that reproduces the shape of the textile preform and an assembly interface;
  b. sealed bagging of the preform on the matrix;
  c. means to apply vacuum inside the bagging comprising the textile preform;
  d. a thermal block, comprising means for induction heating and a receiving interface that cooperates with the die assembly interface for positioning it and for transferring heat between said die and said thermal block.

Thus, the heating means are not carried by the die, which remains simple to make. The assembly interface makes it possible to use the same thermal block for a plurality of tools.

The invention is implemented advantageously in the embodiments and alternatives described below, which may be considered individually or in any technically operative combination.

Advantageously, the thermal block comprises cooling means. In one embodiment that is more particularly adapted for curing a textile preform pre-impregnated with thermosetting resin, the device according to the invention comprises:
  e. a sealed enclosure and means to lock said enclosure on the die;
  f. means to raise the pressure inside the sealed enclosure Advantageously, the thermal unit of the device according to the invention comprises:
  di. a support comprising the receiving interface and a heating interface;
  dii. a thermal accumulator, heated using induction heating means;
  diii. means for communicating heat from the thermal accumulator to the support through the heating interface.

This embodiment makes it possible to limit the electrical power to be supplied to the heating means of the thermal unit, while benefiting at the same time from the advantages of induction heating.

Advantageously, the cooling means comprise a circuit for the circulation of heat-transfer fluid in the support.

Advantageously, the cooling means comprise a circuit for the circulation of heat-transfer fluid around the thermal accumulator.

Advantageously, the heating interface comprises a conformation sheet. Thus, said conformation sheet provides perfect mechanical contact at the heating interface and reduces the contact thermal resistance between the thermal accumulator and the support.

Similarly, the matrix assembly interface comprises a conformation sheet.

The invention also relates to a method for curing or consolidating a textile preform pre-impregnated with a polymer, implementing the device according to the invention in any of its embodiments, which method comprises the steps of:
  i. bagging the preform first laid up on the die;
  ii. applying a vacuum to the inside of the bagging:
  iii. transferring the die and the bagged preform on the thermal block;
  iv. applying a thermal cycle of curing and consolidation to the preform by regulating the temperature of the preform by heating and cooling the thermal block.

In an implementation suitable for curing a textile preform impregnated with thermosetting polymer, the method according to the invention comprises, between steps (ii) and (iv), a step consisting in increasing the pressure in the sealed enclosure.

BRIEF DESCRIPTION OF THE DRAWINGS

The invention is described below in its preferred embodiments, which are not limitative in any way, by reference to FIG. 1, representing sectional views of the device according to the invention in an embodiment that brings together all the optional characteristics of the device. FIG. 1A shows the cooling phase and FIG. 1B shows the heating phase.

DETAILED DESCRIPTION OF THE EMBODIMENTS

In this exemplary embodiment, the device according to the invention comprises a matrix (110) on which a textile preform (100) is laid up, which preform consists in a layered structure of fibrous plies pre-impregnated with thermosetting or thermoplastic polymer. Said preform (100) is bagged on the matrix (110) by means of a vacuum cover (120), using sealing means (121) so that the space between the matrix (110) and the vacuum bag comprising the preform (100) is sealed. In this exemplary embodiment, the matrix (110) comprises conduits (111) opening into said space, which conduits are connected to a vacuum pump (not shown) so as to apply a vacuum to that space. A sealed enclosure (130) that enfolds the preform is locked to the matrix by appropriate assembly means (131). Said enclosure comprises a conduit (132) connected to a pump in order to increase the pressure in said enclosure. Thus, this upper assembly comprising the matrix (110), the bagging means and the sealed enclosure constitutes an independent assembly that makes it possible to implement the pressure cycle corresponding to the consolidation/curing of the textile preform.

The thermal consolidation/curing cycle of the textile preform is brought about by placing the upper assembly on a thermal block, which thermal block comprises, in this embodiment:
- a support (140) made of material with high thermal conductivity, for example an aluminum alloy;
- a base (150) preferably made of refractory material that is transparent to magnetic field, for example concrete or ceramic;
- a thermal accumulator (160) made of material that is suitable for being heated by induction.

The base comprises an induction circuit comprising one or more inductors (151) circulating in cavities made in said base, and connected to a high-frequency current generator, typically ranging between 10 kHz and 100 kHz.

The support (140) comprises channels (141) for the circulation of a heat-transfer fluid that can cool said support. The die is connected to the support (140) by means of an interface with a standard profile, so that a plurality of upper assemblies corresponding to the same shape or different shapes can be positioned on the thermal block. The die assembly surface (116) opposite the molding surface (115), positions said die on the receiving surface of the support (140), advantageously comprises a conformation sheet (112). Said conformation sheet is for example brazed on the assembly surface of the die and is made of material that shows high thermal conductivity but is malleable, such as copper or nickel, so that said conformation sheet makes up for slight differences in shape between the assembly surface of the die and the receiving surface of the support (140).

On the side opposite the receiving side, the support comprises a heating surface that is liable to come in contact with the thermal accumulator. Advantageously, the heating surface comprises a conformation sheet (142), brazed to said heating surface, and suitable for compensating for slight differences in shape between said accumulator (160) and the heating surface of the support (140). In FIG. 1A, in the absence of heating, the accumulator (160) is not in contact with the heating surface. However, said accumulator (160) is however maintained at a temperature known as the holding temperature through inductors. The contact resistance between the accumulator (160) and the heating surface is high and thermal transfer between the thermal accumulator (160) and the support (140) is small.

In FIG. 1B, when heating is in progress, the temperature of the accumulator is increased, so that it is thermally expanded and comes in contact with the heating surface of the support (140). The contact resistance drops, and the thermal accumulator transfers its heat to the support. Said thermal accumulator (160) does not have a structural function in the device according to the invention.

Its composition is thus selected to optimize its response to induction heating and its capacity to transfer its heat to the support (140).

In one particular embodiment, detail Z, said accumulator has a cellular structure, where each cell (165) is filled with phase-change material with latent transition heat. Advantageously, the phase-change material is selected so that its transition temperature is close to the holding temperature of the thermal accumulator. As an example, if the holding temperature is of about 200° C., the phase-change material is for instance an organic material such as a polyol. If the holding temperature is higher, for example about 400° C. or more, the phase-change material is for example a salt. In these examples, the phase-change material changes from the solid state at a low temperature to a liquid state at a higher temperature by absorbing latent transition heat. As it changes from the high-temperature phase to the low-temperature phase, the phase-change material solidifies and gives back said latent transition heat. The combination of the cellular structure and the presence of phase-change material makes it possible to increase the apparent thermal inertia of the thermal accumulator (160) when it is maintained at the holding temperature, while retaining the ability to rapidly heat up to the heating temperature.

The die, and therefore the preform, are cooled by circulating a heat-transfer fluid in the channels (141) of the support. Advantageously, the base (150) comprises conduits (152) for the supply of heat-transfer fluid around the thermal accumulator (160) so as to speed up cooling to the holding temperature after the phase of heating and maintaining the die at the required temperature.

The invention claimed is:

1. A device to cure or consolidate a textile preform pre-impregnated with polymer, comprising:
   - a matrix, without any heater or cooler, comprising a molding face that reproduces a shape of the textile preform and an assembly surface opposite the molding face;
   - a sealed bagging comprising the textile preform on the matrix;
   - a vacuum pump to apply vacuum inside the sealed bagging comprising the textile preform; and
   - a thermal unit comprising:
     - a base comprising cavities and an induction circuit with one or more inductors extending in the cavities and the base being connected to a frequency current generator;
     - a support made of a thermal conductive material comprising a receiving surface that cooperates with the assembly surface of the matrix to position the matrix on the support and to transfer heat between the matrix and the thermal unit, and a heating surface opposite to the receiving surface; and
     - a thermal accumulator in contact with the base, the thermal accumulator being heated by the induction circuit of the base and the heat of the thermal accumulator is transferred to the support by the heating surface of the support.

2. The device according to claim 1, wherein the thermal unit comprises a cooler.

3. The device according to claim 2, further comprising a sealed enclosure and an assembly to lock the sealed enclosure on the matrix; and a pump to raise pressure inside the sealed enclosure.

4. The device according to claim 2, wherein the cooler comprises channels to circulate a heat-transfer fluid in the support.

5. The device according to claim 2, wherein the cooler comprises channels to circulate the heat-transfer fluid around the thermal accumulator.

6. The device according to claim 4, wherein the heating interface of the support comprises a conformation sheet.

7. The device according to claim 1, wherein the assembly surface of the matrix comprises a conformation sheet.

8. A method of curing or consolidating a textile preform pre-impregnated with polymer with a device, the device comprising:
   a matrix, without any heater or cooler, comprising a molding face that reproduces a shape of the textile preform and an assembly surface opposite the molding face;
   a sealed bagging comprising the textile preform on the matrix;
   a vacuum pump to apply vacuum inside the sealed bagging comprising the textile preform; and
   a thermal unit comprising:
      a base comprising cavities and an induction circuit with one or more inductors extending in the cavities and the base being connected to a frequency current generator;
      a support made of a thermal conductive material comprising a receiving surface that cooperates with the assembly surface of the matrix to position the matrix on the support and to transfer heat between the matrix and the thermal unit, and a heating surface opposite to the receiving surface; and
      a thermal accumulator in contact with the base, the thermal accumulator being heated by the induction circuit of the base and the heat of the thermal accumulator is transferred to the support by the heating surface of the support;
   wherein the process comprises steps of:
   bagging the textile preform laid up on the matrix;
   applying a vacuum to inside of the sealed bagging;
   transferring the matrix and the sealed bagged textile preform on the thermal unit; and
   subjecting the textile preform to a thermal cycle to cure and consolidate by regulating a temperature of the textile preform by heating and cooling the thermal unit.

9. The method according to claim 8, between the steps of transferring and applying, comprising a step of increasing the pressure in the sealed enclosure.

\* \* \* \* \*